United States Patent [19]

Tanner et al.

[11] Patent Number: 4,651,395
[45] Date of Patent: Mar. 24, 1987

[54] MANUFACTURE OF PISTON RINGS

[75] Inventors: John E. Tanner; Robert Wedge, both of Wolverhampton, England

[73] Assignee: Laystall Engraving Co. Ltd., England

[21] Appl. No.: 750,661

[22] Filed: Jul. 1, 1985

Related U.S. Application Data

[63] Continuation of Ser. No. 227,296, Jan. 22, 1981, abandoned.

[30] Foreign Application Priority Data

Feb. 11, 1980 [GB] United Kingdom ............... 8004500

[51] Int. Cl.⁴ .................... B23P 15/06; B05D 5/08
[52] U.S. Cl. .................................... 29/156.6; 51/290;
427/198; 427/199; 427/201; 427/276; 427/277;
427/289; 427/359
[58] Field of Search .................... 29/156.63, 156.6;
51/290, 317, 263, 103 WH; 427/198, 199, 201,
204, 232, 234, 241, 276, 277, 289, 292, 356, 359,
369

[56] References Cited

U.S. PATENT DOCUMENTS

| | | | |
|---|---|---|---|
| 1,246,996 | 11/1917 | Pfeifer | 51/263 |
| 2,558,286 | 6/1951 | Albertson | 51/290 |
| 2,577,818 | 12/1951 | Shaw | 51/290 |
| 2,929,174 | 3/1960 | Aumiller | 51/290 |
| 3,137,019 | 6/1964 | Bornefeld | 51/290 |
| 3,333,579 | 8/1967 | Shockley et al. | 51/290 |
| 3,961,104 | 6/1976 | Tanner | 29/156.4 WL |
| 4,125,637 | 11/1978 | Tanner | 29/156.4 WL |

FOREIGN PATENT DOCUMENTS 157413 7/1952 Australia ........................... 51/290

Primary Examiner—Daniel C. Crane
Attorney, Agent, or Firm—Hall, Myers & Rose

[57] ABSTRACT

A method of treating piston rings to render their surfaces extremely hard-wearing, wherein the rings are assembled in batches on a tubular mandrel which is then surrounded by a matching cylinder, the mandrel bearing the rings and the cylinder being subjected to relative cyclical motion while a slurry of hard silicon carbide particles is poured into the cylinder. Either the wall of the tubular mandrel, or the wall of the cylinder, or both, are provided with holes to allow the slurry to flow away. The cyclical motion may consist of relative rotation at 170 r.p.m. and simultaneous relative reciprocation at 5 cycles per minute. The slurry may consist of 220 mesh silicon carbide powder in oil, with the treatment lasting for one minute, and preferably this is followed by a further treatment of one minute with a 400 mesh silicon carbide particle slurry.

12 Claims, 3 Drawing Figures

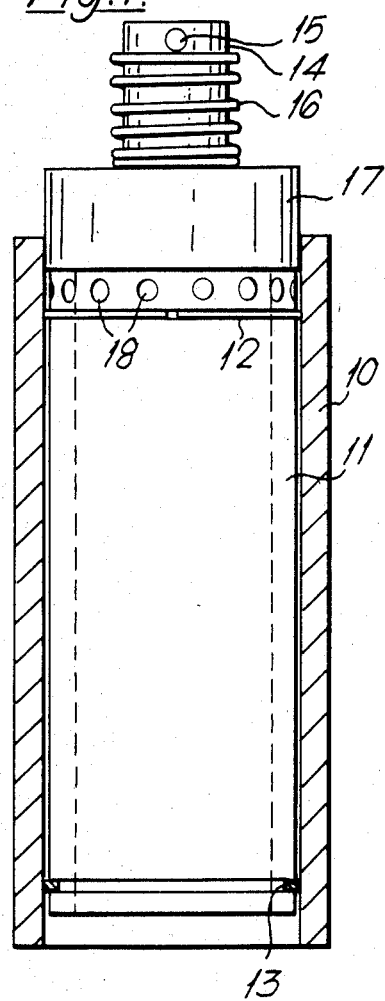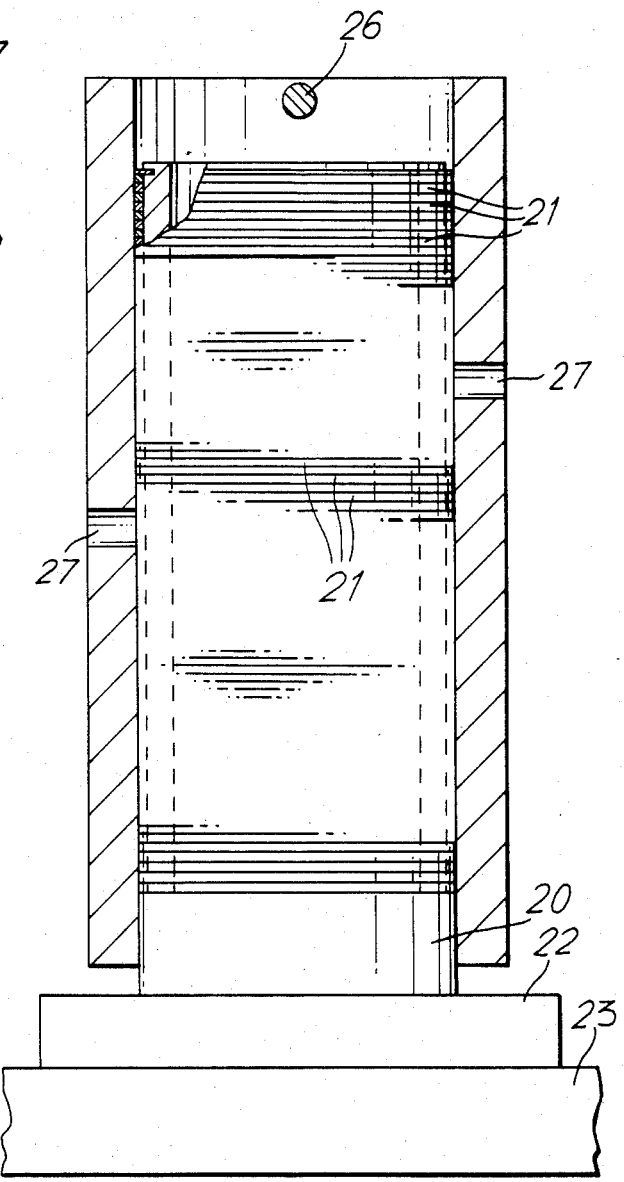

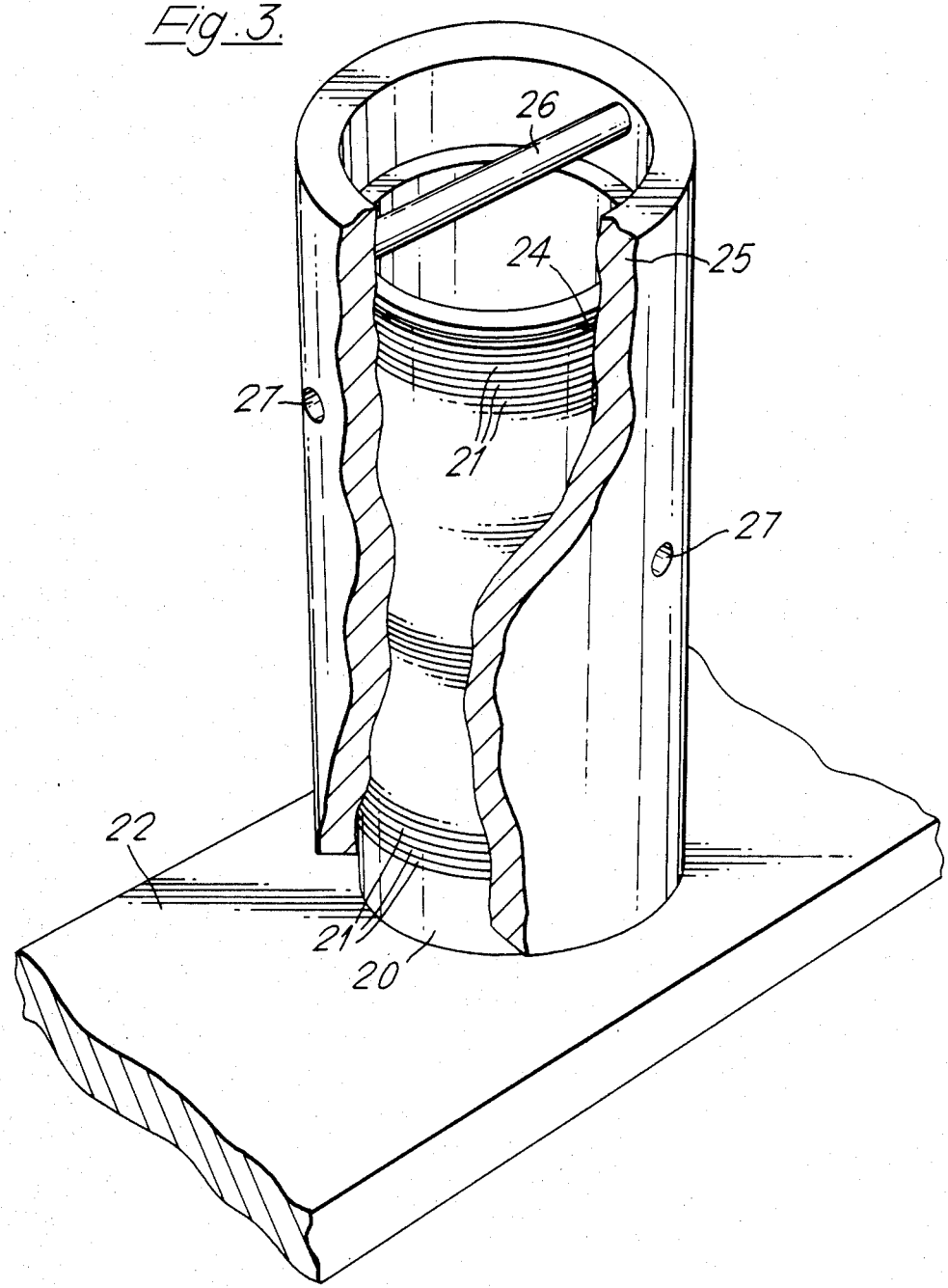

MANUFACTURE OF PISTON RINGS

This is a continuation of application Ser. No. 227,296, filed Jan. 22, 1981, now abandoned.

This invention relates to the manufacture of piston rings, especially piston rings for internal combustion engines.

A process is known for the manufacture of cylinder liners for internal combustion engines in which particles of a hard grit such as silicon carbide are deliberately embedded in the internal wall surface of the liner in order to render the surface extremely hard-wearing. However, there has been no process for treating piston rings in a similar way and it is an object of this invention to provide such a process.

According to the invention, there is provided a method of treating piston rings to render their surfaces extremely hard-wearing, comprising assembling and retaining the piston rings on a mandrel, introducing the mandrel with the rings thereon into a corresponding cylinder, and subjecting the mandrel and cylinder to relative cyclical motion while a slurry of hard particles, especially silicon carbide particles, is poured in.

The cyclical movement may comprise simultaneous relative rotation and reciprocation and the cylinder or the mandrel, which is preferably tubular, may have holes in its wall to allow the slurry to pass through and flow away.

Methods of carrying the invention into effect will now be described by way of example and with reference to the accompanying drawings, in which:

FIG. 1 is a diagrammatic part-sectional elevation of a cyclically moving mandrel, for carrying piston rings to be treated, inserted in a cylinder, FIG. 2 is a similar elevation of an assembly in which the cylinder moves cyclically, and FIG. 3 is a part-sectional pictorial view of the assembly of FIG. 2.

Referring firstly to FIG. 1, the mandrel consists of a vertical hollow tube 11 carried at its upper end by a shaft 14 of smaller diameter. The piston rings 12 are slipped over the tube 11 in batches of 20-50 to 1000 rings depending on the size of the ring, a bottom ring being received in a circumferential groove 13 at the lower end of the mandrel to retain the rings to be treated. At its upper end the mandrel shaft 14 has a lateral drive bar 15 and below this is a compression spring 16 which urges a pressure plate 17 down on to the batch of rings. At intervals along the length of the mandrel tube 11 holes 18 are bored equidistantly around the tube circumference.

The mandrel with the piston rings on it is inserted into a matching cast iron cylinder 10 and is rotated at constant speed (170 r.p.m.) and simultaneously moved repeatedly up and down within the cylinder, at the rate of 5 cycles of reciprocation per minute. At the same time a slurry of 220 mesh silicon carbide powder, in a liquid (oil), is poured into the cylinder. The piston rings, being themselves springy bear outwardly on to the cylinder bore surface and as a consequence become permanently impregnated with carbide particles from the slurry.

During this treatment, the holes 18 in the mandrel tube allow the slurry to flow away.

After one minute of such treatment the piston rings are found to be adequately impregnated with silicon carbide particles. The particles are mostly 5–10 microns in size and are generally to be found at the working surface of the ring, thereby giving an extremely hard-wearing piston ring. Preferably, a second similar treatment is carried out for a further one minute but using 400 mesh silicon carbide. This serves to cut back the peaks of the particles embedded during the preceding step.

FIGS. 2 and 3 show an arrangement in which the mandrel 20 carrying the piston rings 21 is in the form of a pillar fixed on a base plate 22 that in turn is secured to the base 23 of the honing machine. The rings, of which there may be any number from 10 to 1000, are retained on the mandrel by a circlip or keeper 24. The cylinder 25 is placed over the mandrel and rings and has a transverse driving bar 26 so that it can be reciprocated and rotated over the mandrel for which purpose the cylinder is made considerably longer than the ring-bearing portion of the mandrel.

As before, the slurry of silicon carbide powder is introduced into the top of the cylinder and in this case, holes 27 are provided in the cylinder to allow the slurry to escape.

We claim:

1. A method of treating piston rings fabricated from a strong springy material to render the surfaces of the piston rings extremely long-wearing by impregnating them with hard silicon carbide particles, comprising assembling and retaining at least one piston ring on a mandrel, introducing the mandrel with the rings thereon into a cylinder, and thereafter impregnating the ring with hard silicon carbide particles which impregnating steps consist of the steps of (a) subjecting the mandrel and cylinder to relative cyclical motion, (b) pouring a slurry of the hard particles between the cylinder and the mandrel, and (c) initially selecting the inner diameter of the cylinder relative to the outer diameter of the piston ring together with the springy nature of the material of the ring such that the piston ring bears outwardly on the wall of the cylinder sufficient to imbed the particles in the surface of the piston ring.

2. A method according to claim 1, wherein the cyclical motion comprises simultaneous relative rotation and reciprocation.

3. A method according to claim 1 or claim 2, wherein the mandrel is tubular and has holes in its wall to allow the slurry to pass through and flow away.

4. A method according to claim 1, wherein the cylinder has holes in its wall to allow the slurry to pass through and flow away.

5. A method according to claim 1, wherein the piston rings are assembled in a batch on the mandrel between a retaining ring and a spring-loaded pressure plate, and the mandrel is then inserted into the cylinder, which is static, and subjected to cyclical motion therein.

6. A method according to claim 1, wherein the piston rings are assembled and retained on the mandrel, which is static, and the cylinder is then placed over the mandrel and rings and subjected to cyclical motion.

7. A method according to claim 1, wherein the cyclical motion consists of relative rotation at substantially 170 r.p.m. and relative reciprocation at substantially 5 cycles per minute.

8. A method according to claim 1, wherein the slurry consists of 220 mesh silicon carbide powder in oil.

9. A method according to claim 8, wherein after the treatment with 220 mesh silicon carbide particle slurry there follows a similar treatment using a slurry of 400 mesh silicon carbide.

10. A method according to claim 8, wherein the treatment of or each treatment lasts for substantially one minute.

11. A method of treating piston rings fabricated from a strong springy material to render the surfaces of the piston rings extremely long-wearing by impregnating them with hard silicon carbide particles, comprising assembling and retaining at least one piston ring on a mandrel, introducing the mandrel with the rings thereon into a cylinder, the rings being mounted on the mandrel such as to permit the ring to bear outwardly resiliently against the wall of the cylinder and thereafter impregnating the ring with hard silicon carbide particles which impregnating steps consist of the steps of (a) subjecting the mandrel and cylinder to relative cyclical motion, (b) pouring a slurry of the hard particles between the cylinder and the mandrel, and (c) initially selecting the inner diameter of the cylinder relative to the outer diameter of the piston ring together with the compressive strength of the material established by the springy nature of the ring such that the piston ring bears outwardly on the wall of the cylinder sufficient to imbed the particles in the surface of the piston ring.

12. A method of treating piston rings fabricated from a strong springy material to render the surfaces of the piston rings extremely long-wearing by impregnating them with hard silicon carbide particles, comprising assembling and retaining at least one piston ring on an essentially rigid mandrel, introducing the mandrel with the rings thereon into a rigid inner wall of a cylinder, the rings being mounted on the mandrel such as to permit the ring to bear outwardly resiliently against the inner wall of the cylinder and thereafter impregnating the ring with hard silicon carbide particles which impregnating steps comprise the steps of (a) subjecting the mandrel and cylinder to relative cyclical motion, (b) pouring a slurry of the hard particles between the cylinder and the mandrel, and (c) initially selecting the inner diameter of the cylinder relative to the outer diameter of the piston ring together with the springy nature of the material of the ring such that the piston ring exerts a force by bearing outwardly on the rigid inner wall of the cylinder sufficient to imbed the particles in the surface of the piston ring.

* * * * *

UNITED STATES PATENT AND TRADEMARK OFFICE
CERTIFICATE OF CORRECTION

PATENT NO. : 4,651,395

DATED : March 24, 1987

INVENTOR(S) : John E. Tanner; Robert Wedge

It is certified that error appears in the above-identified patent and that said Letters Patent is hereby corrected as shown below:

ON THE TITLE PAGE,

The name of Assignee should read:

"Laystall Engineering Co. Ltd."

Signed and Sealed this

Eighteenth Day of August, 1987

*Attest:*

DONALD J. QUIGG

*Attesting Officer*  *Commissioner of Patents and Trademarks*